(12) United States Patent
Kirby

(10) Patent No.: US 6,250,688 B1
(45) Date of Patent: Jun. 26, 2001

(54) RAMP-LOCK LIFTING DEVICE

(75) Inventor: Kyle K. Kirby, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/088,401

(22) Filed: Jun. 1, 1998

(51) Int. Cl.⁷ ..................................... F16L 35/00
(52) U.S. Cl. .................. 285/81; 285/148.21; 285/360; 285/906; 285/911
(58) Field of Search .................. 285/81, 82, 148.19, 285/148.21, 360, 911, 361, 906

(56) References Cited

U.S. PATENT DOCUMENTS

| | | | |
|---|---|---|---|
| 2,529,821 | * 11/1950 | Snider | 285/361 |
| 2,818,279 | * 12/1957 | Knapp | 285/361 |
| 4,913,199 | 4/1990 | Falckenberg et al. | 141/98 |
| 5,332,271 | * 7/1994 | Grant et al. | 285/911 |
| 5,466,020 | * 11/1995 | Page et al. | 286/361 |
| 5,516,159 | 5/1996 | Hirakawa et al. | 285/388 |

FOREIGN PATENT DOCUMENTS

443869 A2    8/1991   (EP) .

* cited by examiner

Primary Examiner—Dave W. Arola
(74) Attorney, Agent, or Firm—Workman, Nydegger & Seeley

(57) ABSTRACT

A ramp-lock quick-connect fitting is adapted to be placed between conventional type fittings on pipes and tubes, such as quartz pipes and synthetic resin tubes used in chemical processing systems for semiconductor device fabrication. The quick-connect fitting includes a first coupling member having a pipe receiving section adapted to receive a conventional fitting on a pipe, and a ramp support section with a pair of spiral ramps formed therearound. The quick-connect fitting also includes a second coupling member that sealingly engages the first coupling member. An extension portion of the second coupling member is adapted to receive a conventional fitting on a tube. A locking collar is movably engaged with the second coupling member and has a pair of lock members disposed on an interior surface of the collar that slidably engage with the spiral ramps when the collar is rotated around the ramp support section of the first coupling member.

11 Claims, 14 Drawing Sheets

RAMP-LOCK LIFTING DEVICE

BACKGROUND OF THE INVENTION

1. The Field of the Invention

The present invention relates to fittings for connecting pipes or tubing together. More particularly, the present invention relates to a ramp-lock quick-connect fitting device for coupling a pipe, such as a quartz pipe of a quartz tank, to another pipe or tube such as used to convey a liquid into or out of the quartz tank during semiconductor device fabrication processes.

2. The Relevant Technology

During fabrication of semiconductor devices from silicon wafers, various processes are carried out prior to cutting the wafer into individual chips for packaging. At certain stages during fabrication of some semiconductor devices, wet fabrication processes are used such as wet etches. The chemicals used during these wet processes such as acids or alkalies reside in quartz tanks that are resistant to corrosion and high heat. Quartz tanks are also used as part of a system for cleaning silicon wafers, or in a chemical distribution system of a semiconductor production line.

A quartz tank generally includes a quartz outlet/inlet pipe that is in communication with a synthetic resin tube used to convey chemicals into or out of the quartz tank. Quartz pipes are utilized for distributing chemicals since such pipes have high chemical resistance properties, pressure tightness, heat resistance, and the like. Various fittings or pipe joints have been used to connect quartz pipes with synthetic resin tubes.

For example, U.S. Pat. No. 5,516,159 to Hirakawa et al. discloses a quartz pipe joint including a joint body having a pipe receiving portion into which a quartz pipe is to be inserted, a ring-like sealing member held at the pipe receiving portion of the joint body, and a deformable lock ring. A nut to be externally fitted onto the quartz pipe and connected to the joint body is also provided, along with a pressing piece disposed in the nut.

A problem with conventional quartz pipe fittings is that they are difficult to manipulate during routine maintenance procedures, both during assembly and disassembly of the fittings. Conventional quartz pipe fittings are particularly difficult to assemble and disassemble in cramped areas, such as areas underneath quartz tanks where the quartz pipe fittings are located and which are difficult for maintenance personnel to access. These areas typically have a hot acid environment, adding to the difficulties which maintenance personnel have in performing maintenance procedures with conventional fittings in place. The threads on conventional fittings are typically very fine, making it difficult to make connections between the quartz pipe of the tank and other tubing. In addition, conventional quartz pipe fittings often leak and come apart, adding to the time needed to perform repair and maintenance procedures.

While there are several quick-connect type fittings available, such as quick-connect pneumatic fittings and several types of water fittings, none of these are adapted for application to a quartz tank and none can be placed between existing fittings in a piping system without modification of such fittings in some way.

Accordingly, improved fitting devices are needed which allow for easy maintenance of quartz pipe joint areas underneath quartz tanks and in other piping systems.

SUMMARY OF THE INVENTION

The present invention is directed to a ramp-lock quick-connect fitting device providing fluid communication between tubular members such as a pipe and a flexible tube. The quick-connect fitting of the invention is adapted to be placed between conventional type fittings on piping systems typically used in industry such as quartz pipes and synthetic resin tubes used in chemical processing systems for semiconductor device fabrication. The device of the invention provides a quick connect/disconnect coupling for conventional fittings that are otherwise difficult to assemble and disassemble. The device of the invention thus converts the connection of a conventional fitting into a quick connect/disconnect coupling.

In one embodiment of the invention, the quick-connect fitting includes a first coupling member having a pipe receiving section adapted to receive a conventional fitting on a pipe, and a ramp support section with a pair of external spiral ramps formed therearound. The quick-connect fitting also includes a second coupling member that sealingly engages the first coupling member. An extension portion of the second coupling member is adapted to receive a conventional fitting on a tube. A locking collar is movably engaged with the second coupling member and has a pair of lock members disposed on an interior surface of the collar. The lock members slidably engage with the spiral ramps when the collar is rotated around the ramp support section of the first coupling member. The lock members can be a pair of buttons which provide a ramp-to-button coupling mechanism in the quick-connect fitting. In another embodiment, a pair of internal spiral ramps can be formed on the interior surface of the collar which provide a ramp-to-ramp coupling mechanism.

When the quick-connect fitting device of the invention is used in piping systems for transporting strong chemicals, it is preferable to construct the components of the fitting device with materials that are chemically resistant to strong acid, strong alkali, or the like. Suitable materials having chemical resistance that can be utilized to fabricate the components of the fitting device include synthetic resins such as fluorocarbon or fluoropolymer materials. For example, the first and second coupling members described above, which may be exposed to corrosive chemicals during use, can be formed from chemically resistant fluorocarbon materials.

Other embodiments of the quick-connect fitting of the invention include similar components as described above, with the addition of other components to make the quick-connect fitting compatible with certain conventional fittings. In one alternative embodiment, a tube member is disposed in the pipe receiving section of the first coupling member, with the tube member capable of extending into a pipe with a conventional fitting. In another alternative embodiment, the pipe receiving section of the first coupling member includes a collar member disposed in a threaded cavity portion that is compatible with a different conventional pipe fitting.

The quick-connect fitting device of the invention has the advantage of being able to be placed between existing conventional fittings used in plumbing apparatus, eliminating the need for adapting or retrofitting the conventional fittings in order to install the quick-connect fitting of the invention. In addition, the quick-connect fitting allows for easier maintenance of piping systems, since no tools are needed to connect and disconnect the quick-connect fitting of the invention.

These and other aspects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1A:
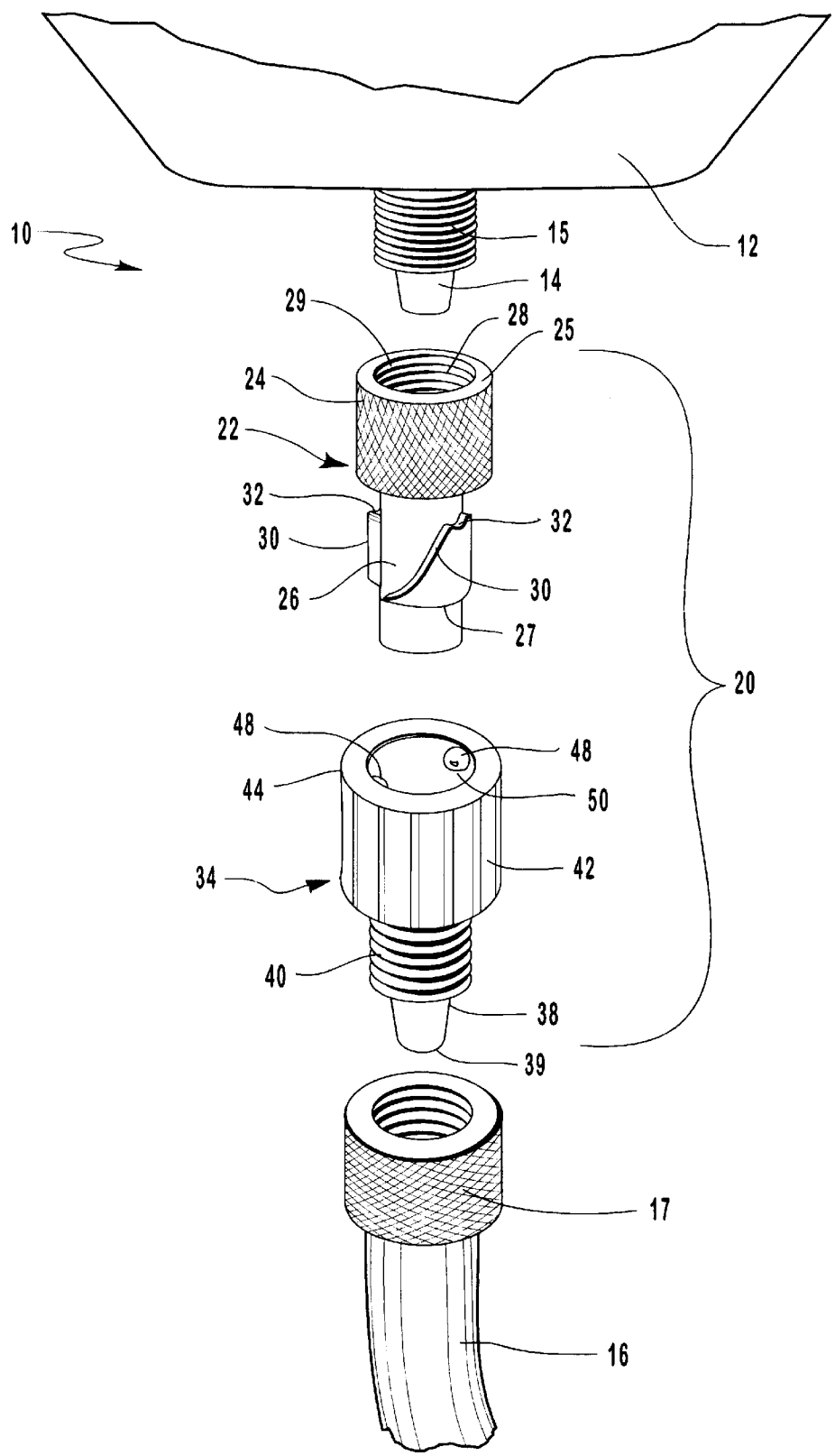
FIG. 1A is an exploded perspective view of a quick-connect fitting according to one embodiment of the present invention shown with suitable conventional pipe fittings used therewith.

The present invention is directed to a ramp-lock quick-connect fitting device for use in industrial piping systems such as those commonly used in chemical distribution systems for semiconductor device fabrication processes. The quick-connect fitting is placed between conventional type fittings on such piping systems and provides fluid communication therebetween. For example, the quick-connect fitting can be used to provide a quick connect/disconnect coupling between conventional fittings of a quartz pipe of a quartz tank and another pipe or tube such as a synthetic resin tube used to convey a liquid into or out of the quartz tank. The quick-connect fitting can thus be used to convert the connection of conventional fittings into a quick connect/disconnect coupling.

The quick-connect fitting device of the invention provides a tight, leakless connection that is easy to manipulate, allowing for ease of maintenance due to its quick connect/disconnect features. The quick-connect fitting device tightens and locks into place with one turn, or is released by a snap-and-turn motion, allowing for ease in changing a tank or a piece of tubing, or putting in a new valve, or like procedures. Thus, the fitting device of the invention is designed for maintenance, providing for easy one-handed assembly and disassembly of a piping system.

The quick-connect fitting device is particularly useful in connections to quartz pipes that communicate with quartz tanks containing strong chemicals such as acids or alkalies used during semiconductor device fabrication processes. The quartz pipes are preferably used as a piping member from a quartz tank since quartz has excellent chemical resistance properties and is not adversely affected by a variation of fluid pressure or fluid temperature.

Since the quick-connect fitting device of the invention can be used in a piping system for transporting chemicals of strong acid, strong alkali, or the like, it is preferable to construct the components of the fitting device with materials that are chemically resistant to strong acid, strong alkali, or the like when the fitting is used in chemical processing systems. Suitable materials having excellent chemical resistance that can be utilized to fabricate the various components of the fitting device include synthetic resins such as fluorocarbon or fluoropolymer materials. Nonlimiting examples of suitable fluorocarbon or fluoropolymer materials include polytetrafluoroethylene (PTFE) available as Teflon, perfluoroalkoxy (PFA), polyvinylidene difluoride (PVDF), and the like. These materials can be used singly or in a variety of combinations to fabricate the components of the fitting device, and provide strong chemical resistance, including corrosion resistance, heat resistance including high temperature resistance, and pressure tightness properties to the fitting device of the invention. Use of these materials permit the components of the fitting device to be coupled with a tight interference fit without any other sealing member therebetween if desired.

Any of the components in the embodiments of the fitting device of the invention, which are described in detail below, can be formed with the above fluorocarbon materials. The fluorocarbon materials can also be utilized as a protective coating formed on a fitting device component fabricated from a hydrocarbon polymer material. Such a protective coating provides chemical resistance to surfaces of the component that will be exposed to highly corrosive chemicals during use.

The quick-connect fitting device of the invention can also be used in a variety of piping systems that utilize tee-pipes, elbow-pipes, bulkheads, valves, couplings, etc., which are typically used for gas and liquid transportation. The quick-connect fitting device is particularly useful with conventional flared tube fittings, either large or small, which are employed mostly for liquid transportation.

Figure 1B:
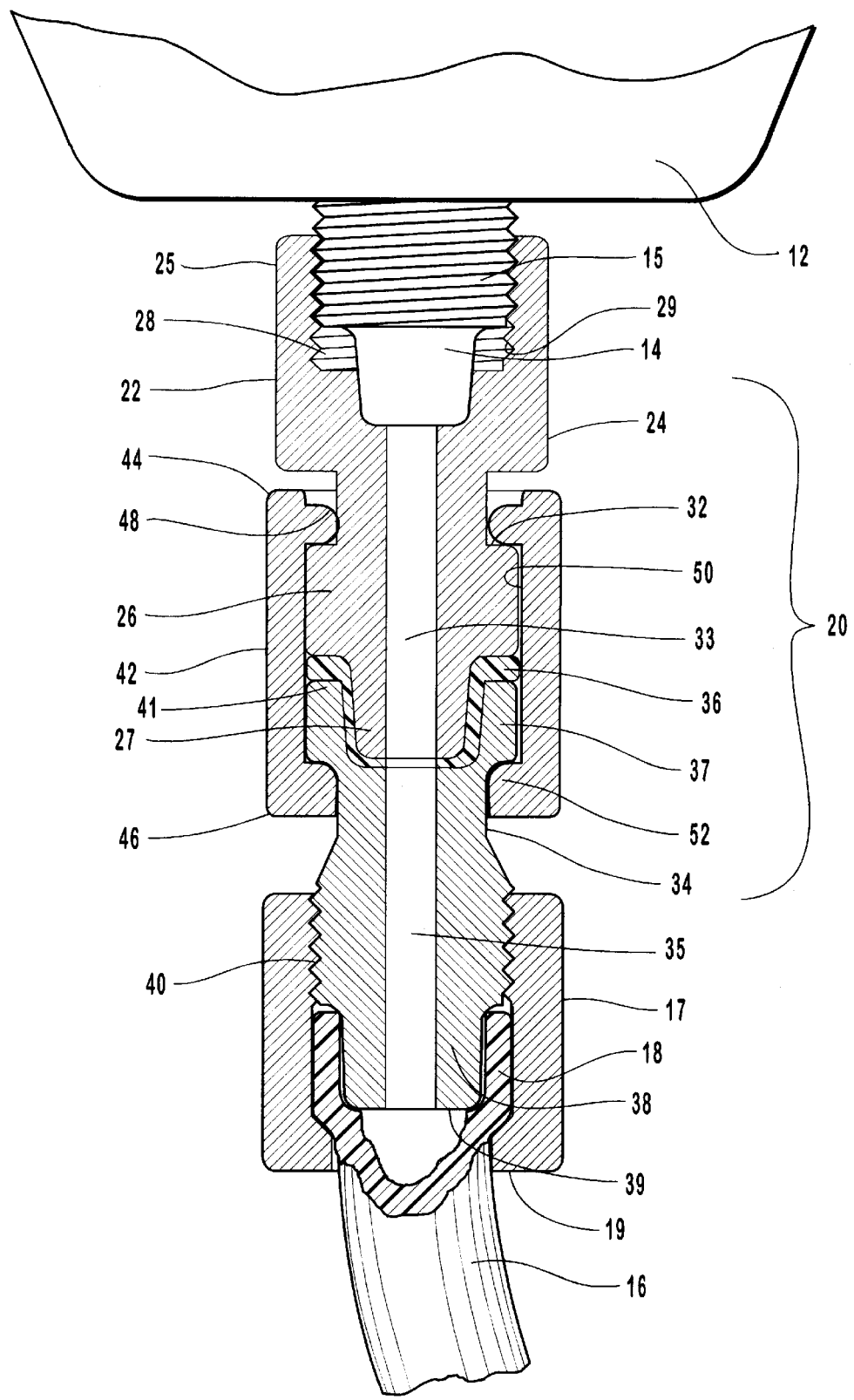
FIG. 1B is an assembled longitudinal cross-sectional view of the quick-connect fitting of FIG. 1A shown coupled to the conventional pipe fittings.
Figure 1C:
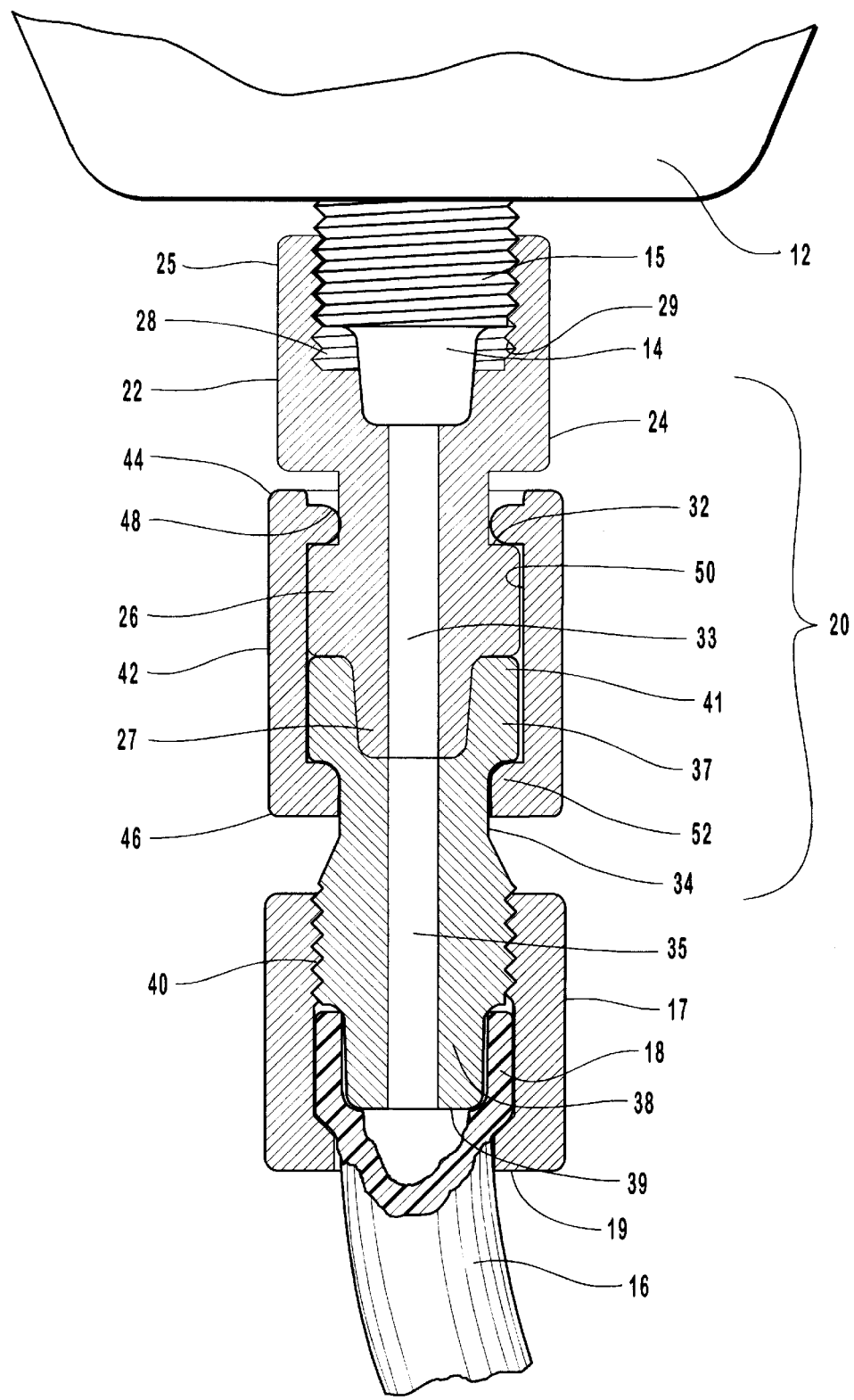
FIG. 1C is an assembled longitudinal cross-sectional view of an alternative embodiment of the quick-connect fitting of FIG. 1A shown coupled to the conventional pipe fittings.

Referring to the drawings, wherein like structures are provided with like reference designations, FIG. 1A shows a portion of a chemical distribution system 10 used in a semiconductor device fabrication process. The system 10 includes a quartz tank 12 having an outlet/inlet quartz pipe 14 thereunder with a conventional threaded fitting 15. A synthetic resin tube 16 is connected to a conventional threaded fitting in the form of a nut 17 adapted to mate with threaded fitting 15. As shown in FIGS. 1B and 1C, tube 16 is stretched at a distal end to form flared end portion 18 with a larger diameter than the remaining portion of tube 16. A lip 19 on nut 17 supports flared portion 18 disposed within nut 17. The conventional fittings are typically used to connect a quartz pipe to a flexible tube, and are available from Fluoroware Corp. under the name of FLARE TEK. Other conventional flare fittings made by Parker Corp. can also be used.

In one embodiment of the invention, a quick-connect fitting 20 is provided for use with the conventional fittings shown in FIGS. 1A and 1B to convert the connection of conventional fittings into a quick connect/disconnect coupling. The quick-connect fitting 20 provides fluid communication between quartz pipe 14 and synthetic resin tube 16.

The quick-connect fitting 20 includes a first coupling member 22 having a pipe receiving section 24 that opens at a proximal end 25, and a ramp support section 26 that terminates at a distal end 27. The pipe receiving section 24 of coupling member 22 opens at proximal end 25 into an internally threaded cavity portion 28 having internal threads 29. The cavity section 28 is sized to receive threaded fitting 15 on quartz pipe 14. A pair of external spiral ramps 30 are formed around ramp support section 26. The ramps 30 start their slopes at distal end 27 and terminate in a pair of lock seats 32 adjacent to pipe receiving section 24. The spiral ramps 30 have a larger rise and a smaller run. As discussed in further detail below, lock seats 32 are adapted to receive a pair of lock members which ride up the ramps 30 and fall into lock seats 32. A passageway 33 in communication with cavity portion 28 extends through distal end 27 of first coupling member 22.

The quick-connect fitting 20 also includes a second coupling member 34 having a passageway 35 therethrough that aligns with passageway 33 in first coupling member 22 as shown in FIG. 1B. A sealing member 36 is disposed on an annular rib 41 at a proximal end 37 of second coupling member 34 to prevent fluid leakage at the interface between second coupling member 34 and first coupling member 22. The sealing member 36, preferably made of a resilient material, defines a recess for receiving distal end 27 of coupling member 22 in an interference fit. An extension portion 38 of second coupling member 34 protrudes away from sealing member 36 and terminates at a distal end 39. The extension portion 38 includes a plurality of external threads 40 formed therearound which are adapted to threadedly engage nut 17 on tube 16.

In an alternative embodiment of fitting 20 shown in FIG. 1C, second coupling member 34 and first coupling member 22 are fitted together without the use of a sealing member by a tight interference fit. The properties of the materials utilized in forming first coupling member 22 and second coupling member 34, such as the above described fluorocarbon materials, as well as the tightness of the coupling, forms a seal without any other member or material such as an o-ring therebetween. Thus, annular rib 41 of second coupling member 34 defines a recess for receiving distal end 27 of first coupling member 22 in a tight interference fit without any other sealing member therebetween.

A locking collar 42 with a proximal end 44 and a distal end 46 is movably engaged with second coupling member 34. The locking collar 42 has lock members in the form of lock buttons 48 disposed on an interior surface 50 at proximal end 44. An inner annular lip 52 is formed at distal end 46 of locking collar 42 and movably abuts against annular rib 41 of second coupling member 34. The lock buttons 48 are adapted to slidably engage with external spiral ramps 30 when locking collar 42 is rotated around ramp support section 26 of first coupling member 22. The lock buttons 48 slide along ramps 30 and fall into place in lock seats 32 when fitting 20 is assembled into a tightened position. The sealing member 36, when used, allows lock buttons 48 to ride over the top of ramps 30 and settle into lock seats 32 in the tightened position of fitting 20.

In assembling quick-connect fitting 20, threaded fitting 15 on quartz pipe 14 is inserted into receiving section 24 of first coupling member 22, and extension portion 38 of coupling member 34 is mated with nut 17 on tube 16. The lock buttons 48 of locking collar 42 are slidably engaged with spiral ramps 30 when locking collar 42 is rotated around ramp support section 26 of first coupling member 22. The lock buttons 48 come to rest in lock seats 32 when locking collar 42 is tightened around ramp support section 26. The quick-connect fitting 20 may be easily disassembled by turning locking collar 42 in the reverse direction to disengage lock buttons 48 from lock seats 32 and rotating collar 42 so as to release collar 42 from ramp support section 26. Thus, when quick-connect fitting 20 is coupled to conventional pipe fittings, an easy twist motion can be used to lock or unlock fitting 20, providing a quick connect/disconnect coupling for conventional fittings that are otherwise difficult to assemble and disassemble.

When quick-connect fitting 20 is used in piping systems for transporting strong chemicals, it is preferable to construct the components of fitting 20 with materials that are chemically resistant to strong acid, strong alkali, or the like. Suitable materials having chemical resistance that can be utilized to fabricate the components of fitting 20 include the fluorocarbon materials discussed above. For example, first coupling member 22 and second coupling member 34, which can be exposed to corrosive chemicals passing through passageways 33 and 35 thereof during use, preferably are comprised of a chemically resistant fluorocarbon material. In addition, locking collar 42 can also be made from a fluorocarbon material if desired.

Figure 1D:
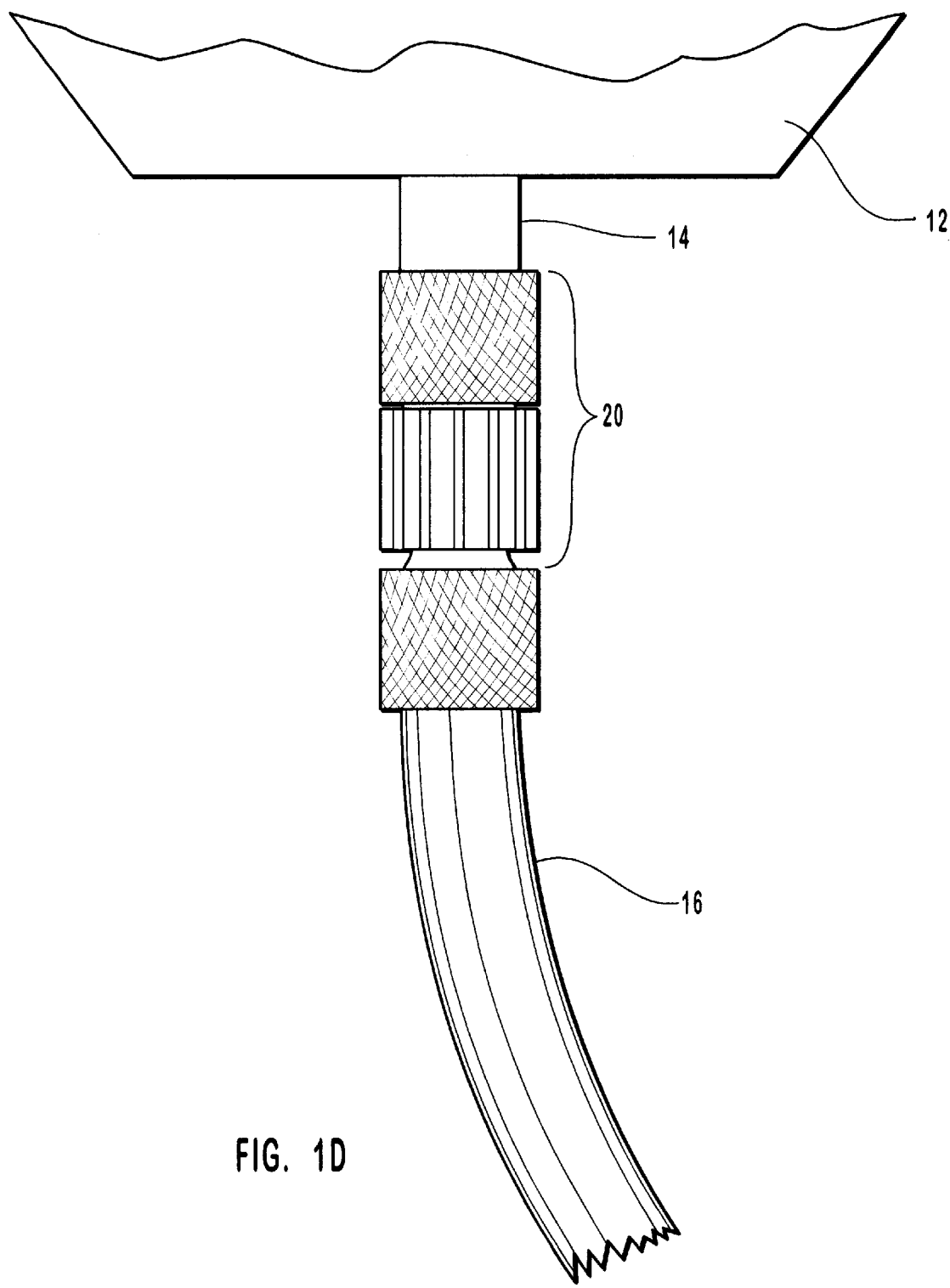
FIG. 1D is a schematic depiction of a system for providing fluid communication to a quartz tank used in chemical processing during semiconductor device fabrication which employs the quick-connect fitting of the present invention.

FIG. 1D is a schematic depiction of system 10, which provides fluid communication to quartz tank 12 used in chemical processing during semiconductor device fabrication. The fitting 20 is coupled to quartz pipe 14 and tube 16 to provide a quick connect/disconnect feature which allows for easy removal of tube 16 from pipe 14 during maintenance or other procedures.

Although fitting 20 of the present invention has been described in relation to connection systems used with quartz pipes employed in semiconductor device fabrication processes, fitting device 20 can be adapted for use in other types of piping systems where quick connect/disconnect features are desirable.

Figure 2:
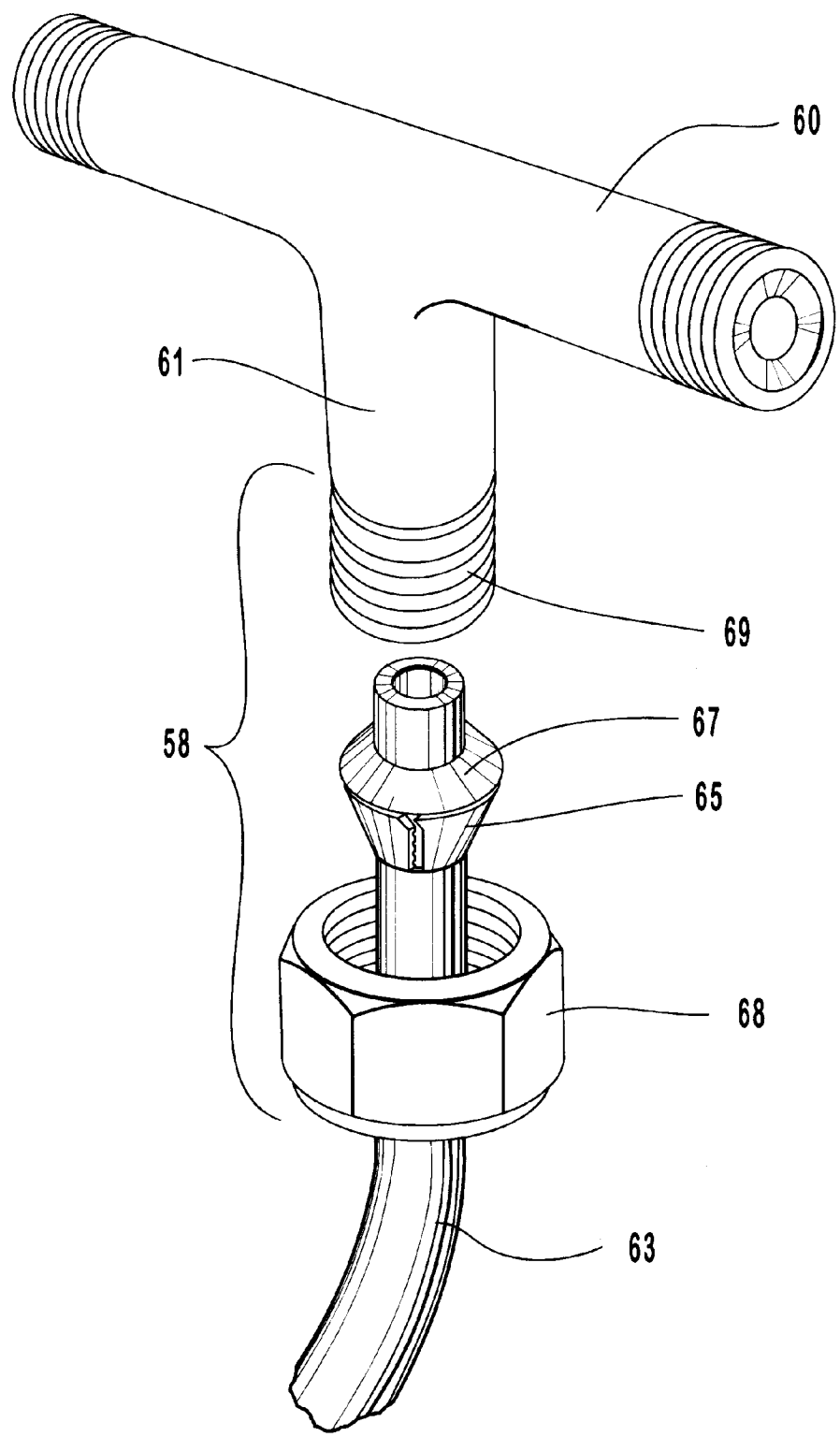
FIG. 2 is an exploded perspective view of another conventional pipe fitting that can be used with the quick-connect fitting of the invention.

FIG. 2 shows a conventional fitting arrangement for connecting tubing to a tee pipe, elbow pipe, etc. As depicted in FIG. 2, a conventional fitting 58 is used to connect a tee pipe 60 having a pipe extension member 61 to a flexible tube 63. The conventional fitting 58 includes a first locking ferrule 65, a second ferrule 67, and a nut 68 slid over the end of tube 63. During connection, second ferrule 67 is slid into pipe extension member 61 of tee pipe 60. The nut 68 is adapted to threadably engage a plurality of outer threads 69 on pipe extension member 61 to secure tube 63 in place, with ferrule 67 sealing the opening to pipe extension member 61. The locking ferrule 65 is compressed by nut 68 to grip tube 63 and hold tube 63 in fitting 58. A plurality of ribs or grips 66 are located on an interior surface of locking ferrule 65, as shown in FIG. 3B, to aid in gripping tube 63.

Figure 3A:
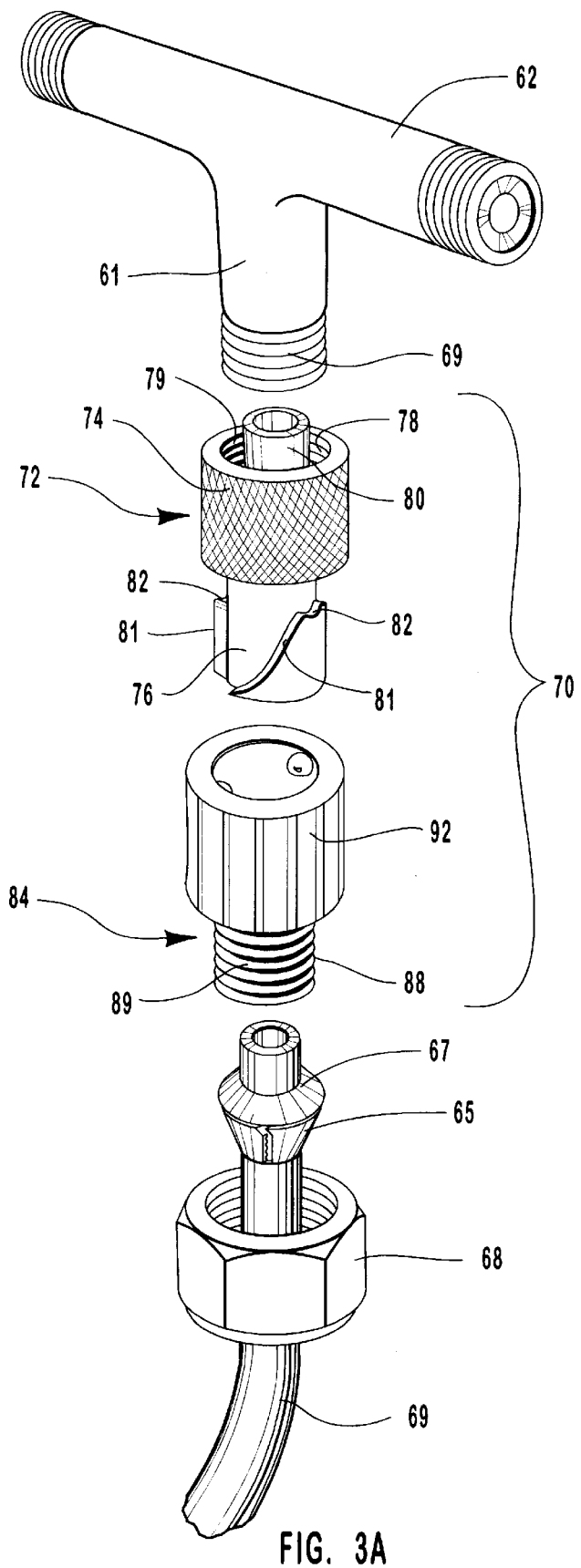
FIG. 3A is an exploded perspective view of a quick-connect fitting according to another embodiment of the invention for use with the conventional pipe fitting of FIG. 2.
Figure 3B:
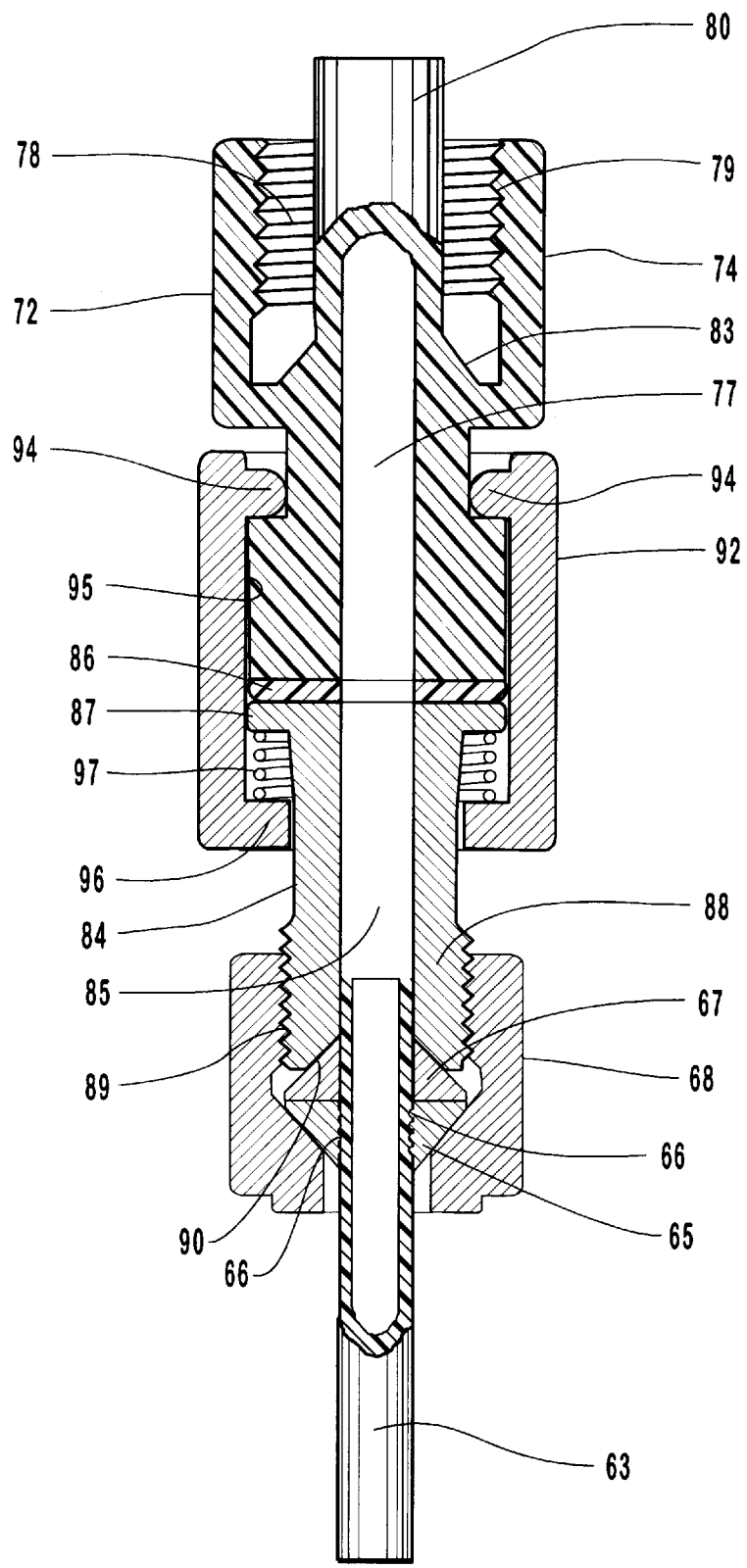
FIG. 3B is an assembled longitudinal partial cross-sectional view of the quick-connect fitting of FIG. 3A shown coupled to the conventional pipe fitting of FIG. 2.

In another embodiment of the invention shown in FIGS. 3A and 3B, a quick-connect fitting 70 is provided for use with the conventional fitting 58 of FIG. 2 to convert the connection of conventional fitting 58 into a quick connect/disconnect coupling. The quick-connect fitting 70 has similar features and operates in a similar manner as quick connect fitting 20 of FIG. 1A, with the addition of certain features so that quick-connect fitting 70 is compatible with conventional fitting 58.

Accordingly, quick-connect fitting 70 includes a first coupling member 72 having a pipe receiving section 74 and a ramp support section 76. A passageway 77 is formed from a proximal end to a distal end of first coupling member 72 for providing fluid communication between tee pipe 60 and tube 63. The pipe receiving section 74 has a cavity portion 78 with internal threads 79. A tube member 80 is disposed within cavity portion 78 of first coupling member 72. The tube member 80 has a flared portion 83 at a lower end thereof which is shaped to correspond with the outer surface of ferrule 67 of conventional fitting 58. This allows tube member 80 to slide into pipe extension member 61 of tee pipe 60 in the same manner as tube 63 with ferrule 67 thereon. The cavity portion 78 is sized to receive pipe extension member 61 of tee pipe 60 so that external threads 69 on pipe extension member 61 engage with internal threads 79 in cavity portion 78 while tube member 80 is inserted into pipe extension member 61. A pair of external ramps 81 are formed around ramp support section 76, with each ramp 81 terminating at a lock seat 82 adjacent to pipe receiving section 74.

The quick-connect fitting 70 also includes a second coupling member 84 having a passageway 85 therethrough that aligns with passageway 77 in coupling member 72 as shown in FIG. 3B. A sealing member 86 is disposed on an annular ridge 87 at the outer proximal end of second coupling member 84 to prevent fluid leakage at the interface of second coupling member 84 and first coupling member 72. An extension portion 88 includes a plurality of external threads 89 that threadedly engage nut 68. A flared opening 90 of extension portion 88 is adapted to receive ferrule 67 as shown in FIG. 3B.

A locking collar 92 is movably engaged with second coupling member 84. The locking collar 92 has a pair of lock buttons 94 disposed on an interior surface 95 at a proximal end of locking collar 92, with an inner annular lip 96 formed at the opposite distal end of locking collar 92. The lock buttons 94 are adapted to slidably engage with external ramps 81 when locking collar 92 is rotated around ramp support section 76 of first coupling member 72. The lock buttons 94 slide along ramps 81 and fall into place in lock seats 82 when fitting 70 is assembled into a tightened position. A resilient bias means such as a spring 97 is provided to allow lock buttons 94 to ride over the top of ramps 81 and settle into lock seats 82. The spring 97 is disposed between annular ridge 87 of second coupling member 84 and annular lip 96 on locking collar 92.

Figure 4:
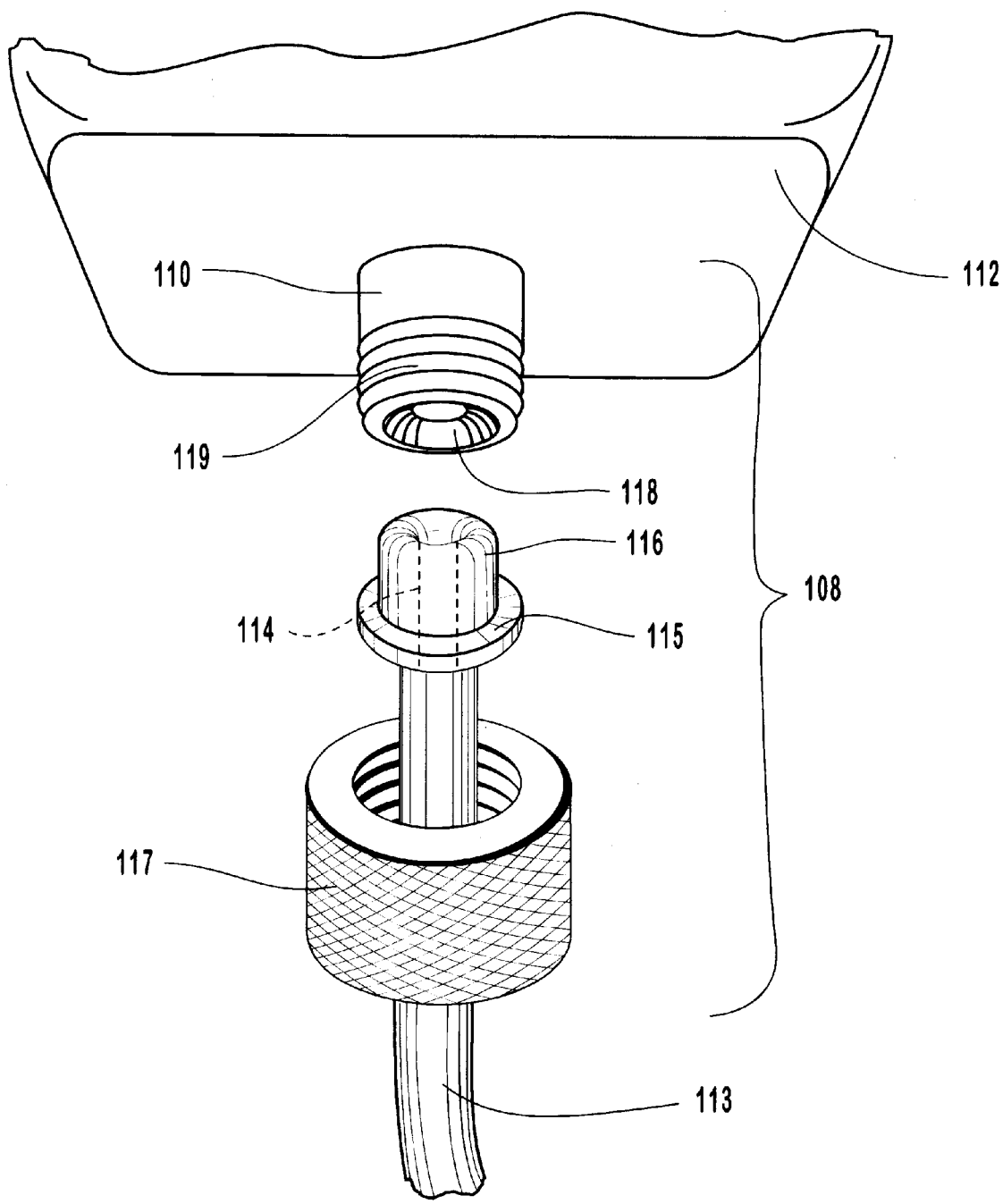
FIG. 4 is an exploded perspective view of another conventional pipe fitting that can be used with the quick-connect fitting of the invention.

FIG. 4 shows another conventional fitting arrangement for connecting tubing to a quartz pipe of a quartz tank. As depicted in FIG. 4, a conventional fitting 108 is used to connect a threaded quartz pipe 110 of a quartz tank 112 to a flexible tube 113. This type of fitting is available from Kurabo Industries under the name of FINAL LOCK. The conventional fitting 108 includes a tubular collar 114 with an annular ridge 115 at one end thereof that slides over an end portion 116 of tube 113. The end portion 116 of tube 113 is folded or rolled over collar 114 and abuts against annular ridge 115 of collar 114 as shown in FIG. 4. A locking nut 117 is adapted to engage annular ridge 115 when nut 117 is slid over tube 113 and collar 114. During connection, end portion 116 is inserted into the opening to quartz pipe 110 and placed against a sealing member 118 therein. The nut 117 is then threadably engaged with a plurality of outer threads 119 on quartz pipe 110 to complete the connection.

Figure 5A:
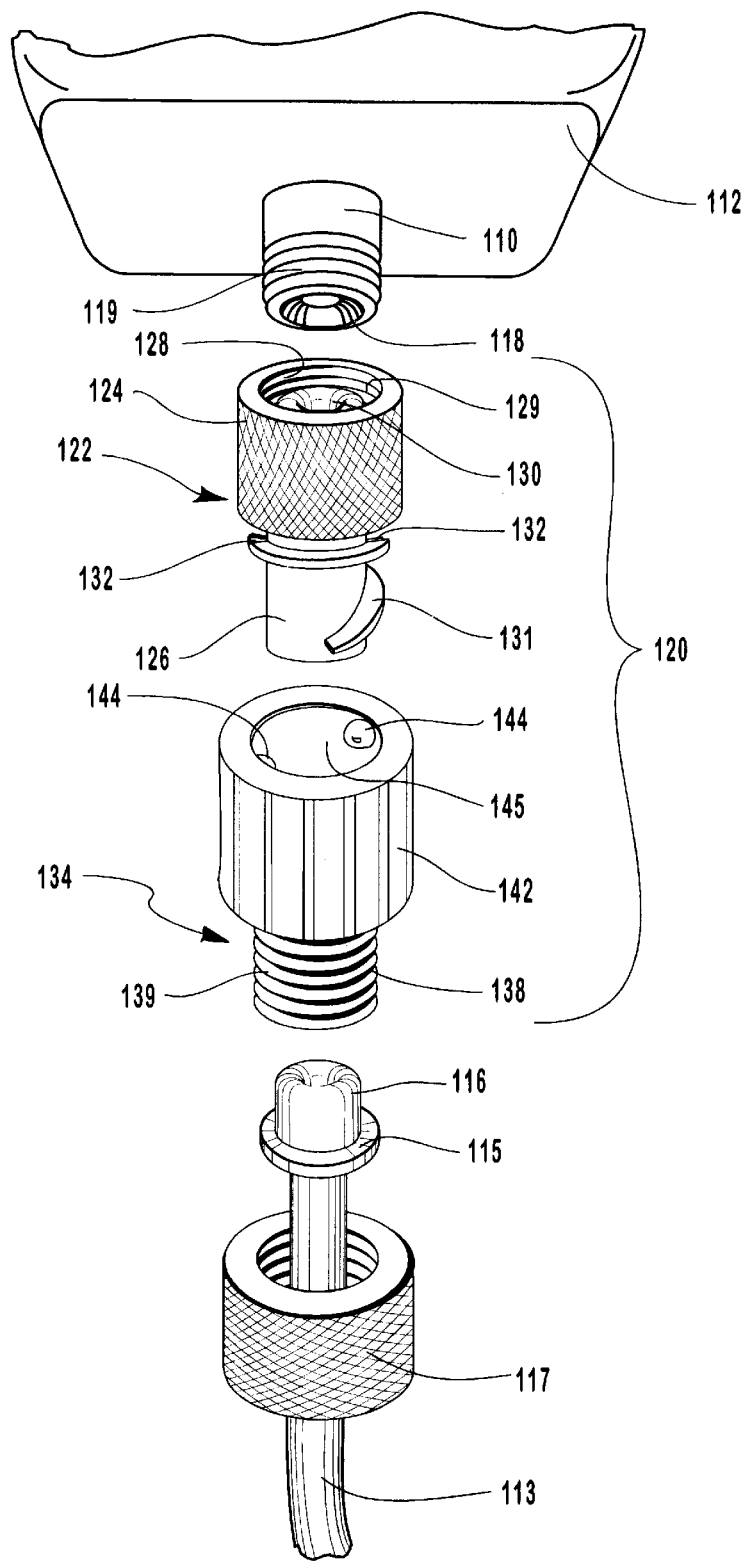
FIG. 5A is an exploded perspective view of a quick-connect fitting according to another embodiment of the invention for use with the conventional pipe fitting of FIG. 4.
Figure 5B:
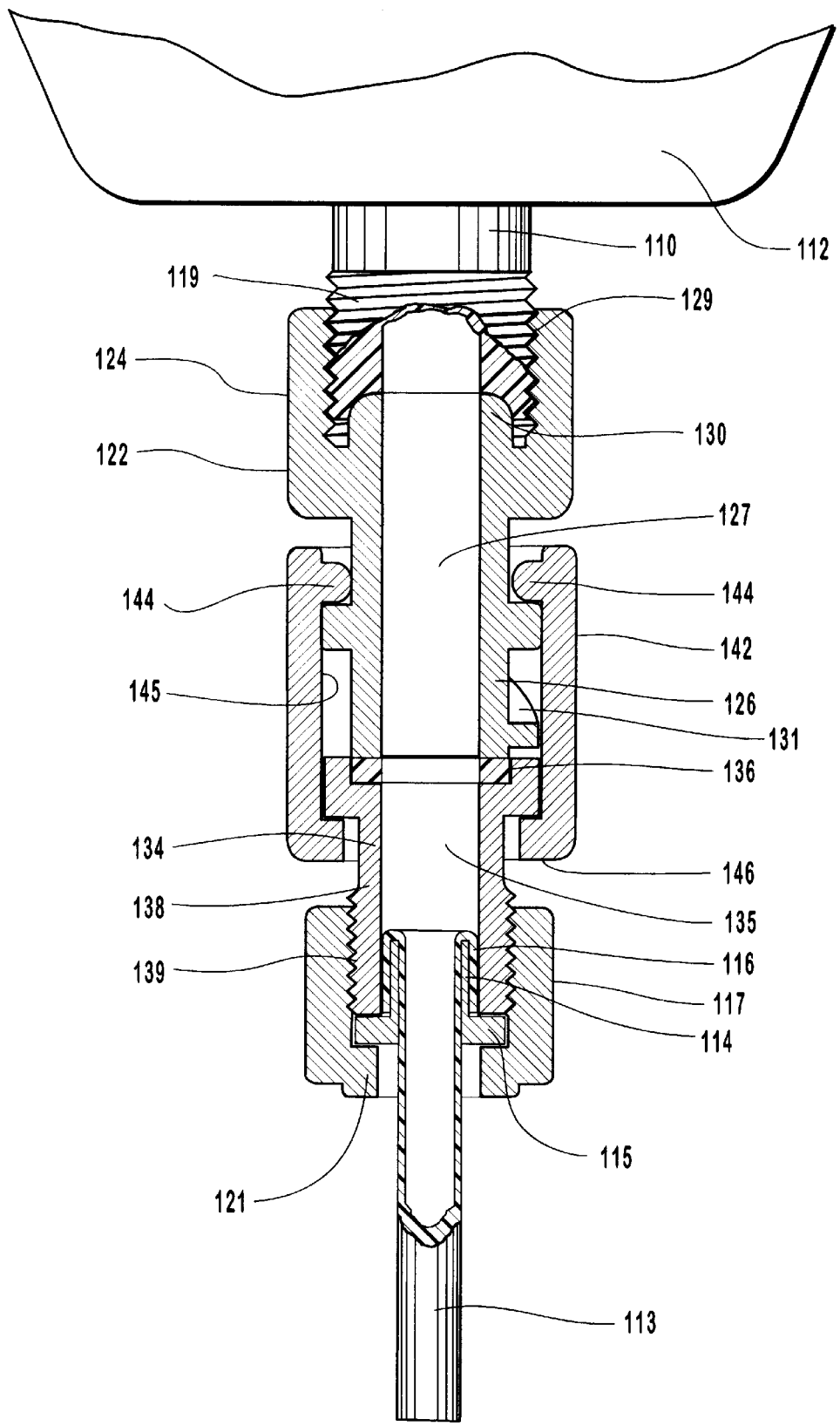
FIG. 5B is an assembled longitudinal cross-sectional view of the quick-connect fitting of FIG. 5A shown coupled to the conventional pipe fitting of FIG. 4.

In another embodiment of the invention shown in FIGS. 5A and 5B, a quick-connect fitting 120 is provided for use with conventional fitting 108 of FIG. 4 to convert the connection of conventional fitting 108 into a quick connect/disconnect coupling. The quick-connect fitting 120 has similar features and operates in a similar manner as quick-connect fitting 20 of FIG. 1A, with the addition of certain features so that quick-connect fitting 120 is compatible with conventional fitting 108.

Accordingly, quick-connect fitting 120 includes a first coupling member 122 having a pipe receiving section 124 and a ramp support section 126. A passageway 127 extends through first coupling member 122 for providing fluid communication between quartz pipe 110 and tube 113. The pipe receiving section 124 has a cavity portion 128 with internal threads 129. An integral collar member 130 is formed in cavity portion 128 of coupling member 122. The collar member 130 is shaped to correspond with the end portion 116 folded over collar 114 in conventional fitting 108 so that collar member 130 fits into the opening to quartz pipe 110 and against sealing member 118 in the same way as end portion 116. The cavity portion 128 is sized to receive the end of quartz pipe 110 so that outer threads 119 on quartz pipe 110 engage with internal threads 129 in cavity portion 128 when first coupling member 122 is connected to quartz pipe 110.

An external ramp 131 is formed around ramp support section 126, with ramp 131 terminating in a pair of lock seats 132 formed along an upper rim adjacent to pipe receiving section 124. As discussed in further detail below, lock seats 132 are adapted to receive a pair of lock members.

The quick-connect fitting 120 also includes a second coupling member 134 having a passageway 135 therethrough that aligns with passageway 127 in first coupling member 122 as shown in FIG. 5B. A resilient sealing member 136 at the outer proximal end of second coupling member 134 is adapted to receive the distal end of first coupling member 122 in an interference fit to prevent fluid leakage at the interface of second coupling member 134 and first coupling member 122. An extension portion 138 of second coupling member 134 includes a plurality of external threads 139 and is adapted to sealingly receive end portion 116 of tube 113 rolled over collar 114 as shown in FIG. 5B.

A locking collar 142 is movably engaged with second coupling member 134. The locking collar 142 has a pair of lock buttons 144 disposed on an interior surface 145 at a proximal end of locking collar 142. An inner annular lip 146 is formed at the opposite distal end of locking collar 142. The lock buttons 144 are adapted to slidably engage with external ramp 131 when locking collar 142 is rotated around ramp support section 126 of first coupling member 122.

Either of lock buttons 144 can slide along ramp 131 and both will fall into place in lock seats 132 when fitting 120 is assembled into a tightened position. The resilient sealing member 136 allows lock buttons 144 to ride over the top of ramp 131 and settle into lock seats 132. The nut 117 is tightened around external threads 139 of second coupling member 134 such that an annular lip 121 on nut 117 abuts against annular ridge 115 of collar 114, thereby securing end portion 116 of tube 113 within passageway 135 of second coupling member 134.

Figure 6A:
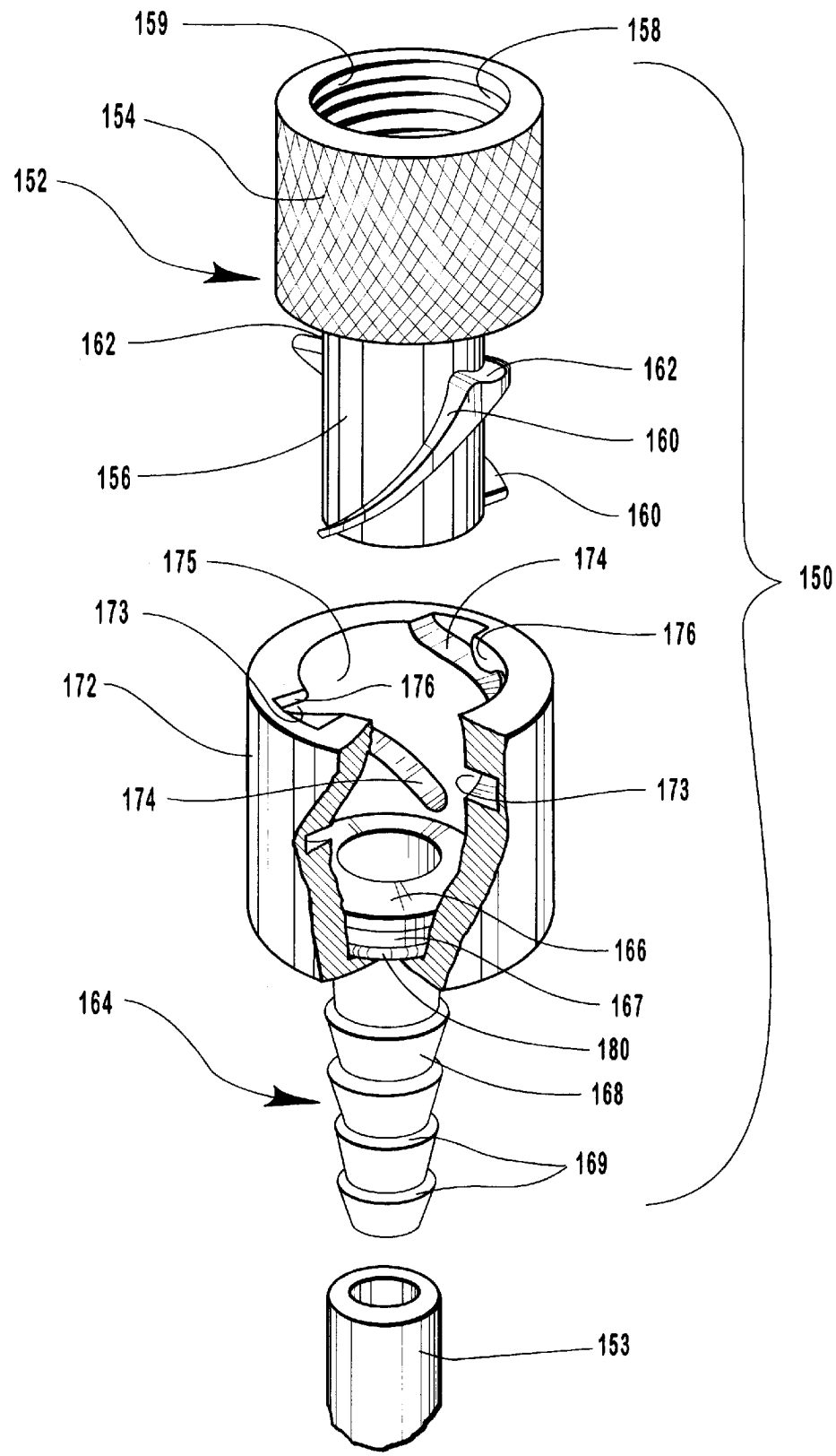
FIG. 6A is an exploded perspective view of a quick-connect fitting according to another embodiment of the invention.
Figure 6B:
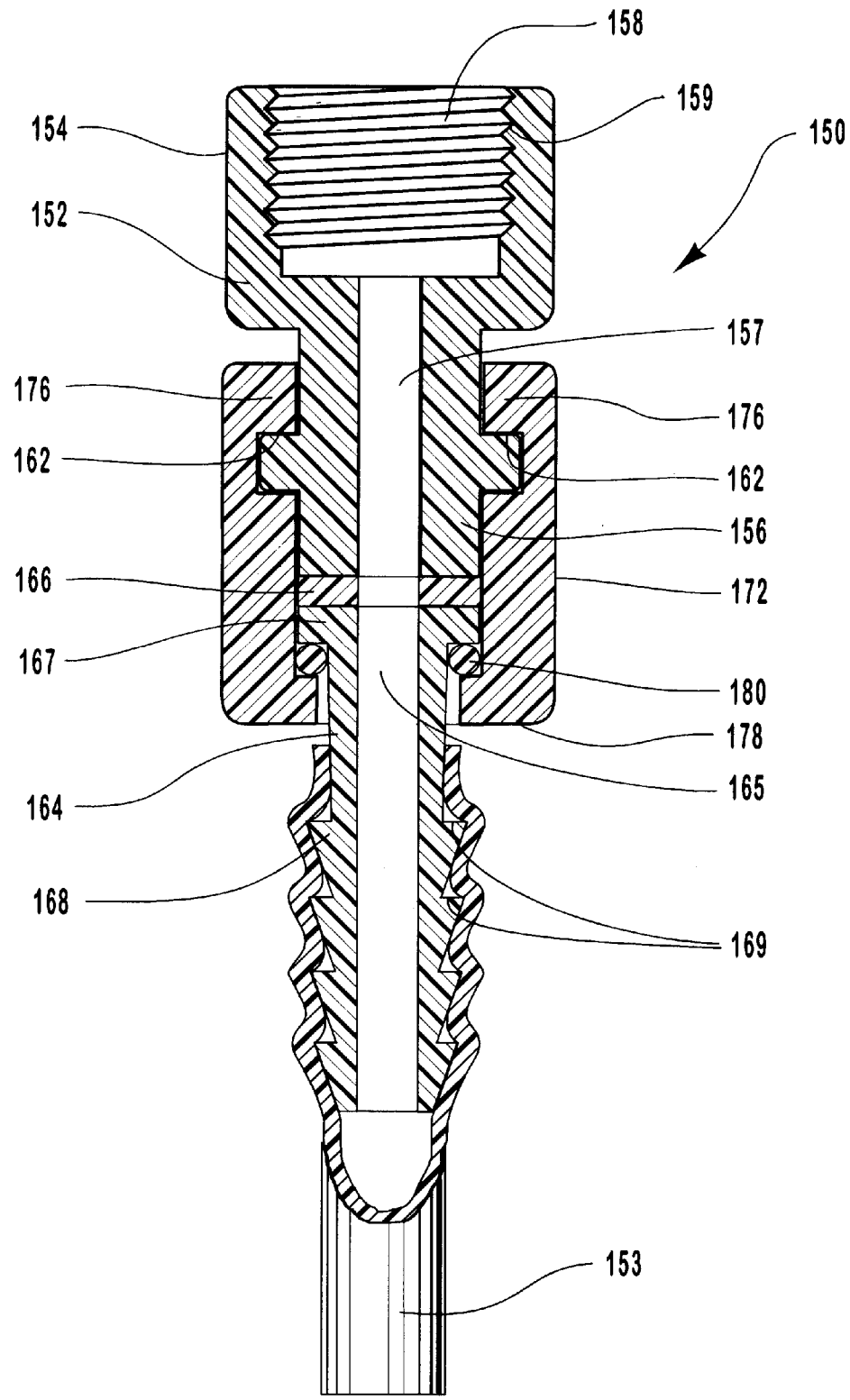
FIG. 6B is an assembled longitudinal cross-sectional view of the quick-connect fitting of FIG. 6A shown coupled to a conventional tube.

In a further embodiment of the invention shown in FIGS. 6A and 6B, a quick-connect fitting 150 is provided for use with a conventional fitting to convert the connection of the conventional fitting into a quick connect/disconnect coupling. The quick-connect fitting 150 utilizes a ramp-to-ramp connection rather than the ramp-to-button configurations of the above described embodiments. The ramp-to ramp connection is particularly suitable for high temperature uses and provides a strong, tight connection.

The quick-connect fitting 150 includes a first coupling member 152 having a pipe receiving section 154 and a ramp support section 156. A passageway 157 extends through first coupling member 152 for providing fluid communication between a pipe (not shown) such as a quartz pipe and a flexible tube 153. The pipe receiving section 154 has a cavity portion 158 with internal threads 159. A pair of external spiral ramps 160 are formed around ramp support section 156, with each ramp 160 terminating at a lock seat 162 adjacent to pipe receiving section 154.

The quick-connect fitting 150 also includes a second coupling member 164 having a passageway 165 therethrough that aligns with passageway 157 in first coupling member 152 as shown in FIG. 6B. A resilient sealing member 166 is disposed on an annular ridge 167 at the outer proximal end of second coupling member 164 to prevent fluid leakage at the interface of second coupling member 164 and first coupling member 152. An extension portion 168 includes a plurality of external ribs 169 and is adapted to receive an end portion of tube 153 as best seen in FIG. 6B.

A locking collar 172 is movably engaged with second coupling member 164. The locking collar 172 has a pair of internal spiral grooves 173 formed on an interior surface 175 of locking collar 172 which define a pair of internal spiral ramps 174. The internal spiral ramps 174 are complimentary with external spiral ramps 160 on ramp support section 156 such that ramps 174 and ramps 164 slidably engage with each other when locking collar 172 is rotated around ramp support section 156 during assembly of quick-connect fitting 150. The grooves 173 also define a pair of lock members 176 at a proximal end of locking collar 172. An inner annular lip 178 is formed at a distal end of locking collar 172. The lock members 176 slide along ramps 174 and fall into place in lock seats 162 when fitting 150 is assembled into a tightened position. A resilient bias member such as an o-ring 180 is provided to allow lock members 176 to ride over the top of each ramp 160 and settle into lock seats 162. The o-ring 180 is disposed between annular ridge 167 of second coupling member 164 and annular lip 178 of locking collar 172.

Figure 7A:
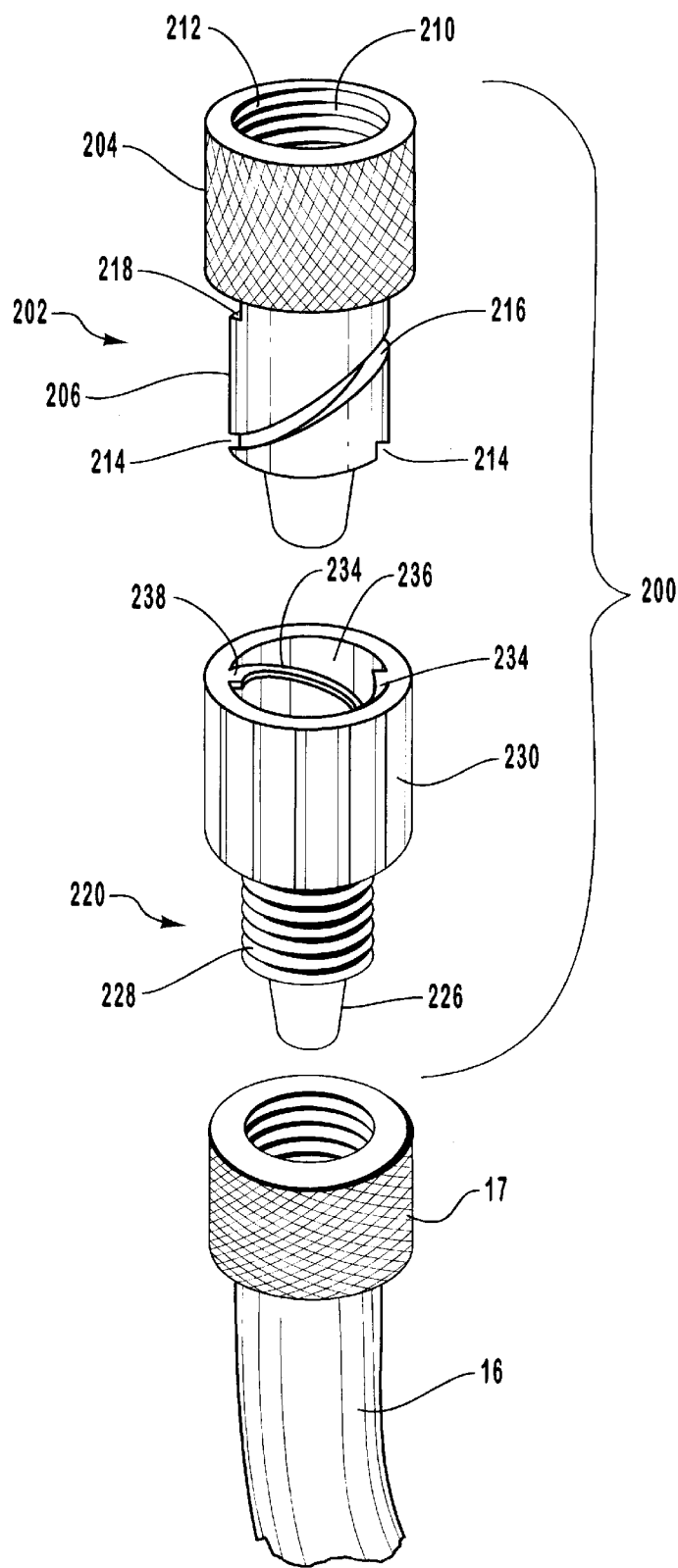
FIG. 7A is an exploded perspective view of a quick-connect fitting according to another embodiment of the invention.
Figure 7B:
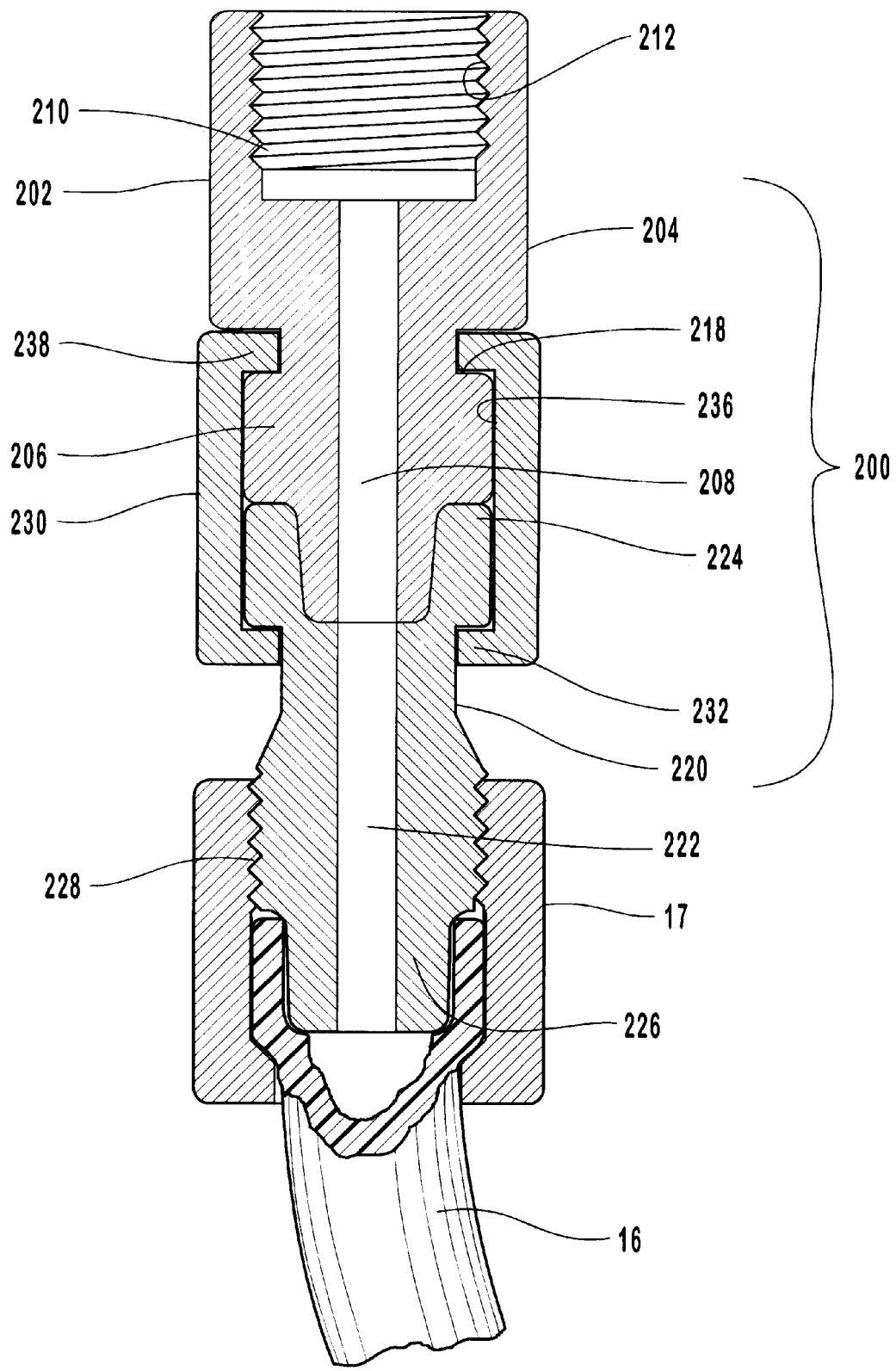
FIG. 7B is an assembled longitudinal cross-sectional view of the quick-connect fitting of FIG. 7A shown coupled to a conventional tube.

In another embodiment of the invention shown in FIGS. 7A and 7B, a quick-connect fitting 200 is provided for use with a conventional fitting to convert the connection of the conventional fitting into a quick connect/disconnect coupling. The fitting 200 has similar features as fitting 20 shown in FIG. 1A, except fitting 200 is configured to be a ramp-to-ramp connection rather than the ramp-to-button configuration of fitting 20.

The fitting 200 includes a first coupling member 202 having a pipe receiving section 204 and a ramp support section 206. A passageway 208 extends through first coupling member 202 for providing fluid communication between a pipe (not shown) such as a quartz pipe and tube 16. The pipe receiving section 204 has a cavity portion 210 with internal threads 212. A pair of spiral grooves 214 in ramp support section 206 define a pair of spiral ramps 216, with each ramp 216 terminating at a lock seat 218 adjacent to pipe receiving section 204.

The fitting 200 also includes a second coupling member 220 having a passageway 222 therethrough that aligns with passageway 208 in first coupling member 202 as shown in FIG. 7B. An annular rib 224 is formed at a proximal end of second coupling member 220. An extension portion 226 of second coupling member 220 includes a plurality of external threads 228 formed therearound which are adapted to threadedly engage nut 17 attached to tube 16.

A locking collar 230 is movably engaged with second coupling member 220. An inner annular lip 232 is formed at a distal end of locking collar 230 and movably abuts against annular rib 224 of second coupling member 220. The locking collar 230 has a pair of spiral ramps 234 formed on an interior surface 236 of locking collar 230. The spiral ramps 234 are complimentary with spiral ramps 216 on ramp support section 206 such that ramps 234 and ramps 216 slidably engage with each other when locking collar 230 is rotated around ramp support section 206 during assembly of fitting 200. The spiral ramps 234 each terminate in a lock section 238 at a proximal end of locking collar 230. The lock sections 238 slide along ramps 216 and come to rest in lock seats 218 when fitting 200 is assembled into a tightened position.

The ramp-lock quick-connect fitting of the present invention has many advantages and benefits. The quick-connect fitting can be placed between existing conventional fittings in plumbing for chemical distribution systems, allowing conventional fittings to be kept on currently used plumbing apparatus. The conventional fittings thus do not need to be adapted or retrofitted in order to install the quick-connect fitting of the invention. The quick-connect fitting applied between conventional fittings in a piping system converts a difficult to assemble and disassemble connection system into an easy quick connect/disconnect system, making it simpler to attach and detach tubing such as to a quartz tank. The quick-connect fitting also allows for easier maintenance of piping systems, since no tools are needed to connect and disconnect the fitting of the invention.

The present invention provides for easy alignment of pipes to be connected and alleviates the difficulties of cross threading between conventional fittings in cramped areas. The quick-connect fitting is also useful in plumbing systems containing often replaced components such as valves or pumps, in systems having lines that are often switched, and in liquid or pneumatic plumbing or fixtures.

Although some embodiments of the fitting device of the present invention have been described in relation to connection systems used with quartz pipes employed in semiconductor device fabrication processes, these embodiments can be adapted for use in other types of piping systems where quick connect/disconnect features are desirable. Thus, the fitting device of the invention can be applied to a variety of tubular members. For example, the fitting device of the invention can be used to connect one pipe to another pipe, a flexible tube to another flexible tube, straight pipes to elbow pipes, flexible tubes to elbow pipes, a pipe to a plug, a tube to a plug, a pump to a tube, a valve to a tube, and in a variety of other piping combinations.

It should be understood that the various embodiments described herein can be modified to incorporate selected features described herein and be within the intended scope of the invention. For example, the ramp-to-ramp connection configuration can be utilized in any of the above quick-connect fitting embodiments instead of the ramp-to-button configuration. In addition, it is possible to use only a single ramp in any of the quick-connect fitting embodiments instead of the pairs of ramps.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for providing fluid communication to a quartz tank used in a semiconductor device fabrication process, the system comprising:
   a quartz pipe extending from the quartz tank, the quartz pipe including an externally threaded fitting;
   a synthetic resin tube having an internally threaded fitting on one end thereof that is compatible with the externally threaded fitting on the quartz pipe; and
   a quick-connect fitting providing fluid communication between the quartz pipe and the synthetic resin tube, the quick-connect fitting comprising:
      a first coupling member having a proximal end and a distal end, the first coupling member including a pipe receiving section threadably engaged with the externally threaded fitting of the quartz pipe, and a ramp support section with at least one spiral ramp formed therearound;
      a second coupling member having a proximal end and a distal end, the second coupling member including a sealing member at the proximal end thereof that is engaged with the distal end of the first coupling member, and an extension portion protruding away from the sealing member that is threadably engaged with the internally threaded fitting of the synthetic resin tube; and
      a locking collar movably engaged with the second coupling member and having at least one lock member disposed on an interior surface of the collar that is slidably engaged with the at least one spiral ramp of the first coupling member.

2. The system of claim 1, wherein the spiral ramp includes a lock seat which supports the lock member of the locking collar.

3. The system of claim 1, wherein the at least one spiral ramp of the first coupling member includes a pair of spiral ramps.

4. The system of claim 3, wherein the at least one lock member includes a pair of lock members that are engagable with the pair of spiral ramps.

5. The system of claim 1, wherein the lock member is a button.

6. The system of claim 1, wherein the first and second coupling members comprise a chemically resistant fluorocarbon material.

7. The system of claim 6, wherein the fluorocarbon material is selected from the group consisting of polytetrafluoroethylene, perfluoroalkoxy, polyvinylidene difluoride, and combinations thereof.

8. A system for providing fluid communication to a quartz tank used in a semiconductor device fabrication process, the system comprising:
   a quartz pipe extending from the quartz tank, the quartz pipe including an externally threaded fitting;
   a synthetic resin tube having an internally threaded fitting on one end thereof that is compatible with the externally threaded fitting on the quartz pipe; and
   a quick-connect fitting providing fluid communication between the quartz pipe and the synthetic resin tube, the quick-connect fitting comprising:
      a first coupling member having a proximal end and a distal end with a passageway therethrough, the first coupling member including a pipe receiving section threadably engaged with the externally threaded fitting of the quartz pipe, and a ramp support section with a pair of spiral ramps formed therearound that terminate in a pair of lock seats;
      a second coupling member having a proximal end and a distal end with a passageway therethrough, the second coupling member including a sealing member at the proximal end thereof that is engaged with the distal end of the first coupling member, and an extension portion protruding away from the sealing member that is threadably engaged with the internally threaded fitting of the synthetic resin tube; and
      a locking collar movably engaged with the second coupling member and having a pair of lock buttons disposed on an interior surface at the proximal end of the collar that are slidably engaged with the pair of spiral ramps of the first coupling member.

9. The system of claim 8, wherein the pair of lock seats support the lock buttons of the locking collar.

10. The system of claim 8, wherein the first and second coupling members comprise a chemically resistant fluorocarbon material.

11. The system of claim 10, wherein the fluorocarbon material is selected from the group consisting of polytetrafluoroethylene, perfluoroalkoxy, polyvinylidene difluoride, and combinations thereof.

\* \* \* \* \*